United States Patent [19]

Kessel et al.

[11] 4,253,480
[45] Mar. 3, 1981

[54] PRESSURE REGULATOR FOR FLUID PRESSURES

[75] Inventors: Gerd Kessel, Geiselbullach; Heinrich Kümmeke, Zorneding; Hans-Jürgen Kupfer, Oberschleissheim; Joachim Rau, Munich, all of Fed. Rep. of Germany

[73] Assignee: Knorr-Bremse GmbH, Munich, Fed. Rep. of Germany

[21] Appl. No.: 20,654

[22] Filed: Mar. 15, 1979

[30] Foreign Application Priority Data

Mar. 16, 1978 [DE] Fed. Rep. of Germany ....... 2811345

[51] Int. Cl.³ ............................................. G05D 16/20
[52] U.S. Cl. .................................. 137/102; 137/487.5
[58] Field of Search ................ 137/102, 487.5, 101.19; 303/20

[56] References Cited

U.S. PATENT DOCUMENTS

| 3,398,993 | 7/1968 | Sarbach | 303/20 |
| 3,402,972 | 9/1968 | Cooper | 137/487.5 |
| 3,807,810 | 4/1974 | Yarber | 303/20 |
| 3,856,034 | 12/1974 | Itoh | 137/487.5 |
| 3,858,598 | 1/1975 | Carman | 137/102 |

FOREIGN PATENT DOCUMENTS 1100672  3/1961  Fed. Rep. of Germany .
1160491  1/1964  Fed. Rep. of Germany .

Primary Examiner—Gerald Goldberg
Assistant Examiner—Denis E. Corr
Attorney, Agent, or Firm—Edmund M. Jaskiewicz

[57] ABSTRACT

A pressure regulator has at least one solenoid valve operated by electrical signals connected to a container the actual pressure of which is indicated by a pressure electric transducer. A comparator generates a regulation signal which is the difference between the actual pressure and a command pressure signal. A regulator is connected to the comparator for generating a control signal to the solenoid valve in such a manner that the valve member of the solenoid valve is adjustable in a stable manner between intermediate positions within a range between the open and closed positions of the valve such that throttled pressure media continuously flows through the valve. The valve adjustment signal can be a continuously variable direct voltage which is proportional to the output signal of the regulator and may be a rectangular or saw-toothed voltage with a frequency exceeding the maximum actuating frequency of the solenoid valve. The regulator has an integral function and is preferably a proportional integral regulator. The container may be provided with both inlet and outlet valves for control of the pressure in the container and the regulator produces separate control signals for the inlet and outlet valves.

10 Claims, 6 Drawing Figures

PRESSURE REGULATOR FOR FLUID PRESSURES

The present invention relates to a pressure regulator for fluid pressures, more particularly, to such a pressure regulator for regulating air pressures in motor vehicles by the control of solenoid valves.

It has been known to provide many different kinds of devices for regulating fluid pressures, such as air pressures in the air braking and other systems of motor and rail vehicles. These pressure regulators generally operate by a controlled opening and closing of the inlet and outlet solenoid valves in order to achieve a desired pressure within a container. Examples of such pressure regulators are disclosed in the German Pat. Nos. 1 160 491 and 1 100 672 and in the U.S. Pat. Nos. 3,398,993, 3,402,972 and 3,807,810. The regulation of the opening and closing of the solenoid valves must be accomplished within precise limits in order to obtain accurate regulation of the pressure in the container. To avoid a too frequent switching of the valves and to also reduce the quantity of air consumed by such regulators, the switching hysteresis is selected relatively high. This, however, has the further effect of reducing the accuracy of the regulation. The inlet and outlet valves are positioned either in a completely open or completely closed position to control the introduction or discharge of air from a container in order to maintain the pressure in the container at a certain desired level.

It has also been known to use a solenoid for a valve actuating device wherein the solenoid receives an error signal in order to adjust the opening of a valve to positions intermediate the valve closed and open positions.

It is therefore the principal object of the present invention to provide an improved pressure regulator of the type generally described above which makes possible a precise and accurate control of the level of pressure within a container while significantly reducing the consumption of air required by this pressure regulation.

The present invention discloses the regulation of fluid pressure in a container by controlling a solenoid valve in such a manner that the valve has a continuously variable opening therethrough. A solenoid valve controlled according to the present invention thus functions as a constantly controlled restrictor. The control of the solenoid valve occurs in such a manner that a range of possible valve opening positions is stable and remains stable even in the presence of mechanical vibrations and shocks and impacts to which the valve may be subjected. The present invention enables one to achieve a very precise and sensitive pressure regulation to attain a predetermined or desired pressure value. The closer the actual pressure within the container approaches to the desired pressure the smaller will be the cross-sectional openings of the inlet and outlet solenoid valves. As a result, the actual pressure value constantly approaches the desired pressure value and a consumption of the air due to fluctuating or hunting of the inlet or outlet valves is avoided.

According to one aspect of the present invention a device for regulating the pressure of a fluid pressure medium may comprise an electrically operated solenoid valve connected to a container and having a valve member therein movable between open and closed positions of the valve passage. An electrical signal is generated which is indicative of the actual pressure in a container. A comparator generates a difference signal indicative of the difference between the actual pressure in the container and a desired pressure for the container. An integrator receives the difference signal from the comparator and generates a regulator signal from which is produced a control signal to adjust the solenoid valve member within a range intermediate the valve closed and open position so as to provide a continuously variable passage through the valve during a predetermined period of time. The control signal may comprise an impulse formed voltage signal having a frequency greater than the maximum actuating frequency of the solenoid valve.

An advantage of the present pressure refulator is that the valve member is in a floating or continuous state of opening and as a result only a very slight amount of wear occurs between the valve member and the valve seat. This wear is considerably smaller than in valves used in previous pressure regulators wherein the valve is actually completely opened or completely closed.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
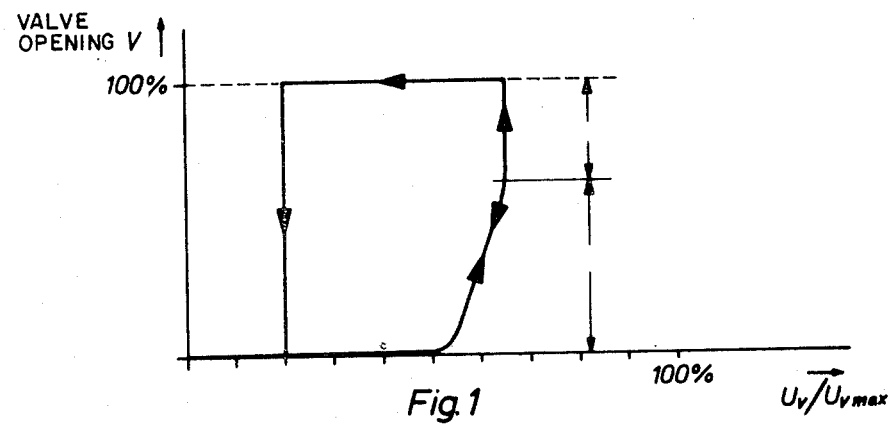
FIG. 1 is a diagram showing the opening of the valve member as a function of the control voltage imposed on the solenoid of the valve.

In FIG. 1, the opening V of a solenoid valve is expressed as a percentage of its complete opening indicated at 100% as a function of a standardized voltage $U_v/U_{vmax}$ imposed on the solenoid valve. From the diagram of FIG. 1 it is apparent that the valve opening over a very small range varies directly proportional to the voltage imposed on the valve. Subsequent to this constant range as the voltage is increased there is an unstable range in which a switching of the valve occurs. It is to be borne in mind that this sloping or constant range is stable and can be traversed in both directions by the increase or decrease of voltages imposed upon the valve. The valve will essentially remain in this constant range even in spite of mechanical vibrations or any other impacts or shocks imposed upon the vehicle in which such a valve is installed.

If the voltage imposed on the valve is extended beyond the constant range then the valve switches and opens completely. Upon a subsequent reduction of the imposed voltage the valve will operate through the hysteresis curve as shown in FIG. 1 and will close completely upon reaching a minimum holding voltage which is at about 20% of the maximum voltage. The sloping constant range of operation of the valve can only be reached from a closed position of the valve as is also apparent from FIG. 1. A solenoid valve used in the pressure regulator of the present invention has a constant range which begins at about 60% of the valve voltage and terminates at about 75%. If the imposed voltage is increased beginning from 0, the valve will remain completely closed until reaching the abovementioned 60% voltage value.

The point on the diagram at which the valve opening shifts from 0 into the constant range is determined essentially by the construction and other parameters of the valve design and also by thermal influences and manufacturing tolerances. Similarly, the path of the constant range depends upon these parameters.

Figure 2:
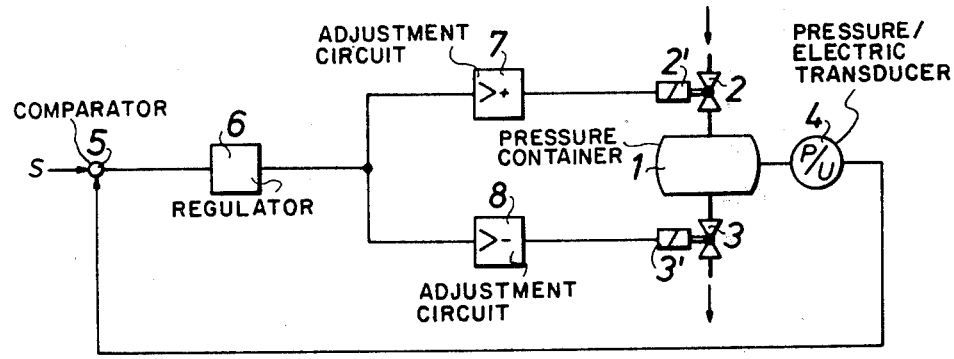
FIG. 2 is a block diagram showing schematically the pressure regulator according to the present invention.

In the block diagram of FIG. 2, a pressure container 1 whose pressure is to be regulated is connected through an inlet solenoid valve 2 having a magnetic coil 2' to a source of pressurized air, which is not shown. The container 1 is also connected with an outlet solenoid valve 3, having a magnetic coil 3', which may be connected to the atmosphere.

The pressure in the pressurized container 1 is measured by a pressure-electric transducer 4 and converted into an actual pressure signal which is indicative of the pressure within the container 1. The actual pressure signal is supplied to a comparator 5 which functions as a summer in which the actual pressure signal is compared with a desired or command pressure signal S. A difference signal proportional to the difference between the command pressure signal and the actual value signal is produced at the outlet of the comparator 5 and supplied to the input of a regulator 6 which functions as an integrator.

In the regulator 6 the difference signal is converted to a regulator output signal of a polarity corresponding to the characteristic of the difference signal and then supplied to adjustment circuits 7 and 8 for generating a control signal for solenoid valves 2 and 3. The adjustment circuits 7 and 8 are connected so that they correspond only to positive or negative regulator output signals. The output control signals of adjustment circuits 7 and 8 are actually electrically connected to the magnetic coils 2' and 3'.

The regulator 6 comprises preferably a proportional integrator and the circuits 7 and 8 can comprise known direct-voltage driven amplifiers (with polarity selection) or of chopper amplifiers which will be described in further detail with respect to FIG. 3.

Figure 3:
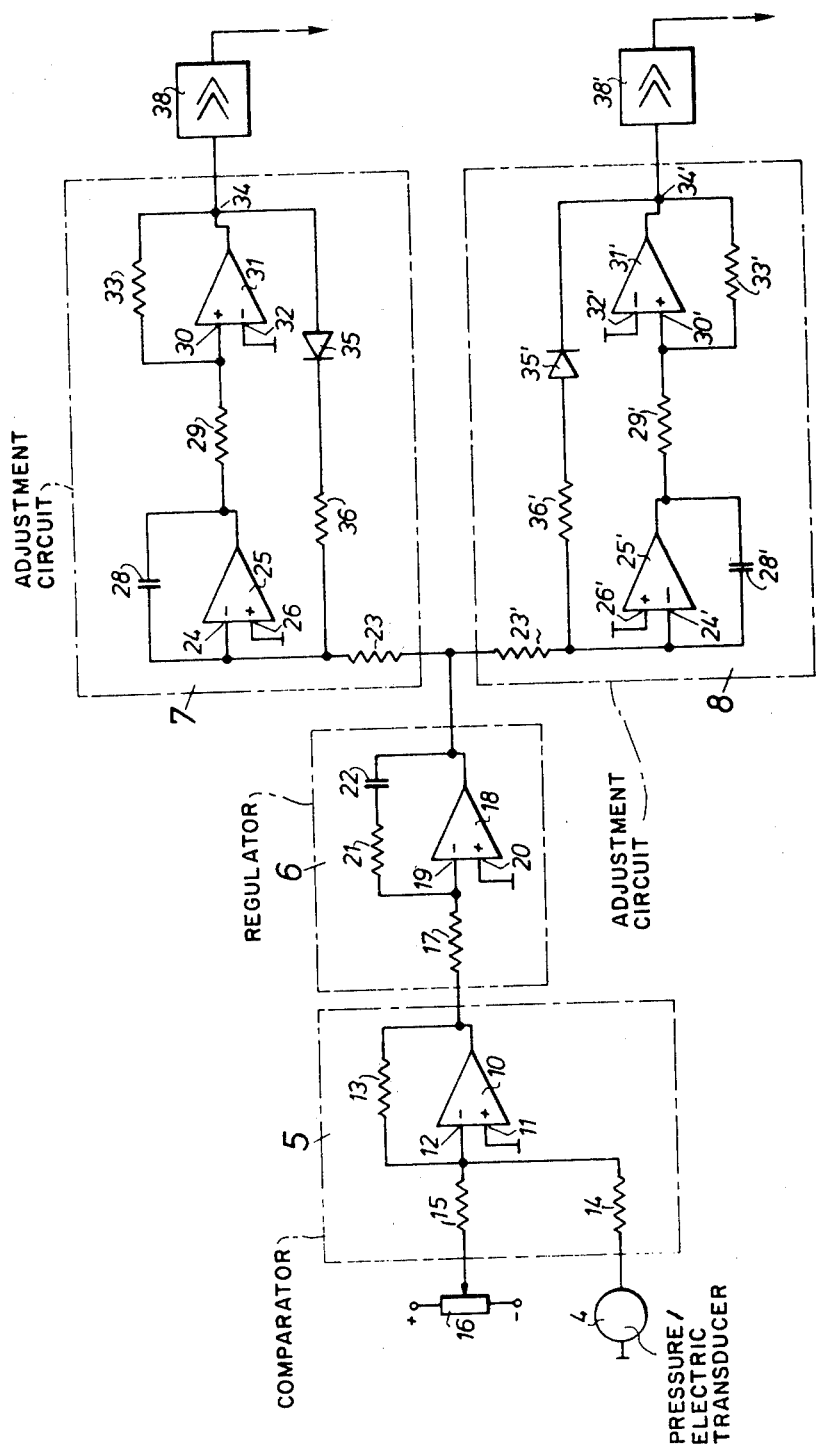
FIG. 3 is an electrical circuit diagram of the pressure regulator illustrated in FIG. 2.

As may be seen in FIG. 3, the comparator 5 which is essentially a summing amplifier consists of an operational amplifier 10 whose positive input 11 is connected to ground and whose negative input 12 is connected over a feedback resistance 13 to the output of the amplifier 10. The negative input 12 is connected through a resistance 14 with the pressure-electric transducer 4 and through another resistance 15 is connected with the tap of an adjustable resistance 16 which provides the source of the command or desired value signal. The other junctions of the adjustable resistance 16 are connected with positive and negative supply voltages as indicated.

The output of the amplifier 10 is connected through a resistance 17 to an inverted input 19 of an operational amplifier 18 whose non-inverted input 20 is connected to ground. The output of amplifier 18 is connected over a series-connected condenser 22 and a resistance 21 with the inverted input 19. The output of the amplifier 18 and thus of the regulator 6 is connected with the inputs of both adjusting circuits 7 and 8 which are identical except for the polarity of diodes 35 and 35', as will be presently described.

The adjustment circuit 7 which is shown as a chopper amplifier in FIG. 3 has an input resistance 23 one junction of which is connected to the output of amplifier 18 and its other junction connected with an inverted input 24 of an amplifier 25. The amplifier 25 has a non-inverted input 26 which is connected to ground. An output 27 of amplifier 25 is connected over a condenser 28 with the input 24. The output 27 is connected over a resistance 29 with a non-inverted input 30 of an amplifier 31 whose inverted input 32 is connected to ground. An output 34 of amplifier 31 is connected over a positive feedback resistor 33 with input 30. The output 34 of amplifier 31 is connected through a series-connected diode 35 and a resistor 36 to the inverted input 24 of the amplifier 25. The diode 35 is connected such that it is positioned in the forward direction for a current flow from output 34 to input 24.

The output 34 is connected over an adaptor circuit 38 with the inlet solenoid valve 2 and may comprise, for example, a conventional power amplifier. The adjustment circuit 8 is identical with circuit 7 and similar reference symbols are used to identify the several components. However, in circuit 8, the polarity of diode 35' is reversed with respect to diode 35 of circuit 7 so that the diode 35' is connected in the resistance direction from the output 34' of amplifier 31' to the input 24' of amplifier 25'. The output of the adaptor circuit 38' is connected with the magnetic coil 3' of the exhaust or outlet valve 3. It is to be borne in mind that under certain circumstances it may be desireable to construct the circuit 38' in an inverted manner.

The operation of the pressure regulator according to the present invention is next described with reference to FIG. 4.

It is initially assumed that the pressure in the container 1 as measured by the transducer 4 is greater than the pressure desired in the container. Thus, a positive voltage should be imposed on the input 12 of the amplifier 10. A negative voltage will then appear at the output of the amplifier which is then amplified and integrated in regulator 6 so that after a short period of time there occurs an increased voltage which is imposed in parallel on the inputs of the circuits 7 and 8.

In the circuit 8 this positive voltage introduced to the amplifier 25' causes the negative voltage $U_{25'}$ to be produced on outlet 27'. This voltage is then amplified in the voltage follower amplifier 31' in such a manner that upon reaching a predetermined threshold the voltage is switched completely from positive to negative value. The feedback circuit 35',36' is switched for this negative voltage in the forward direction so that at the output 24' of amplifier 25' this negative voltage is superimposed by the positive voltage at the output of regulator 6 by means of which the integrating amplifier 25' will again integrate.

As soon as the output signal $U_{25'}$ has reached a threshold value, amplifier 31' switches back to a positive starting level. The adaptor circuit 38' on whose input a negative pulse was imposed during the above-described operation is constructed in an inverted manner so that a positive impulse controlling an outlet solenoid valve has appeared at its output. After switching of the amplifier 31' to a positive starting level, the diode 35' is in the high-resistance direction so that the positive regulator output signal again is effective and the above-described process is repeated. As long as diode 35' is closed, the steepness or slope of the integration is effected by the resistance 23' and the condenser 28'. As soon as amplifier 31' has been switched over and diode 35' becomes conductive, the integration constant of amplifier 25' is additionally dependent on the ratios of the resistors 23' and 36'. The values of the resistors 23' and 36' and of the condensor 28' are so selected that integration occurs so rapidly in both directions that the frequency of the resulting output signal is greater than the maximum switching frequency of the connected solenoid valve.

The above-described operation occurs similarly in circuit 7 at the start as long as the switching amplifier 31 is switched through to a negative level. At this point, the feedback circuit 35, 36 is blocked so that the circuit 7 cannot oscillate and thus is out of operation. The circuits 38 and 38' are constructed in such a manner that they respond only to high-frequency signals which, for example, are attained by a high-pass filter or other known electrical components and circuits responding to pulses.

In the event that the actual pressure in container 1 is less than the command or desired pressure, then a negative signal will be imposed on input 12 of amplifier 10 which, analogous to the above-described operation, will generate a signal declining to negative values on the output of amplifier 18. In the integrating amplifier 25, this signal will produce an output signal $U_{25}$ which will increase to a positive value as shown in FIG. 4. As soon as this signal $U_{25}$ has attained a certain value at time $t_1$, the amplifier 31 switches back to the positive starting level as indicated by the curve $U_{31}$ in FIG. 4.

At this point the diode 35 becomes conductive and the amplifier integrates from time $t_2$ to time $t_3$. At time $t_3$, amplifier 31 switches back to a negative starting level and the amplifier 25 integrates upwardly again to the extent that an input signal exists on imput 24 so that the process is repeated as indicated by the graph in FIG. 4.

Figure 4:
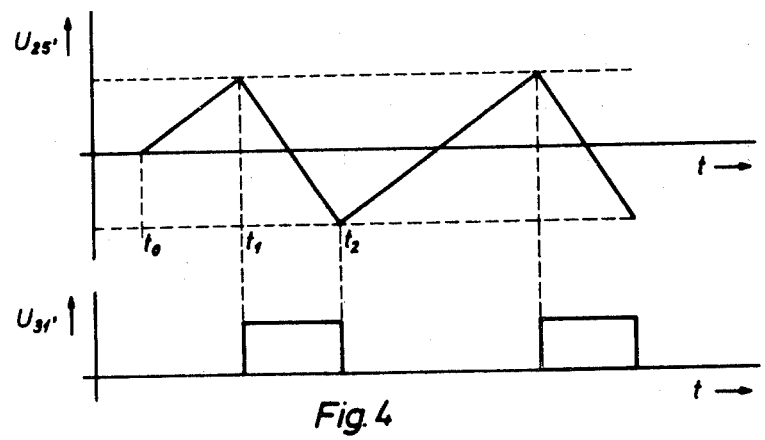
FIG. 4 is a diagram showing the voltage curve of individual signals of the circuit according to FIG. 3.

As will be apparent from FIG. 4, the switching on time of amplifier 31 and thus the impulse time for the inlet solenoid valve (in addition to the value of regulator 6 output signal) is dependent on the time constant of integration and thus on the resistors 23 and 36 and on the condenser 28 together with the switching thresholds of amplifier 31 and on the resistors 29 and 33. The switching off period of the amplifier 31 on the other hand is not dependent on the value of resistor 36.

Figure 5:
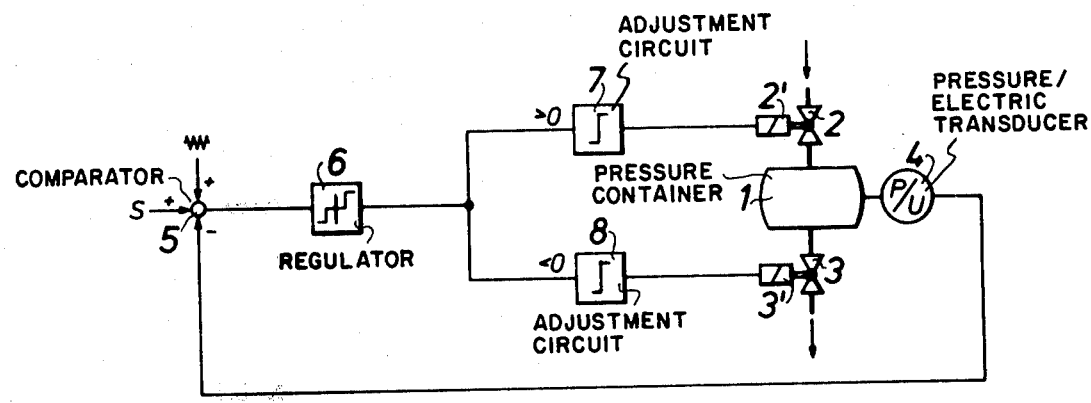
FIG. 5 is a block diagram showing schematically a modification of the pressure regulator of the present invention.
Figure 6:
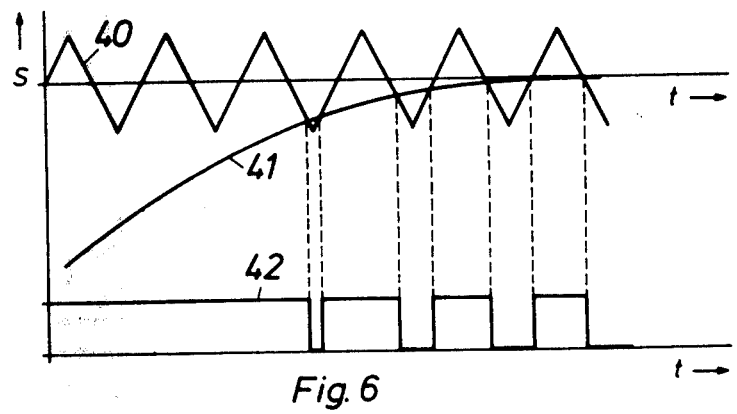
FIG. 6 is a diagram showing the voltage curve of individual signals of the modified pressure regulator of FIG. 5.

In the modification of FIG. 5, the pressure container 1, the solenoid valves 2 and 3 with their respective magnetic coils 2' and 3', the pressure voltage transducer 4, the comparator 5, the regulator 6 and the circuits 7 and 8 are connected to each other in the same manner as shown in FIG. 2. However, according to FIG. 5, a high-frequency alternating voltage signal is also supplied to the comparator 5 and imposed on the command value S. This alternating voltage signal can be sinusoidal, pulse-shaped, or, as illustrated in FIGS. 5 and 6 triangular or sawtoothed in nature. The regulator 6 comprises a switching amplifier having a predetermined hysteresis and the circuits 7 and 8 also comprise switching amplifiers whereby the amplifier of circuit 7 responds to a positive signal and the amplifier of circuit 8 responds only to a negative signal.

In the operation of the pressure regulator of FIG. 5, curve 40 as shown in FIG. 6 illustrates the alternating voltage superimposed upon the command or desired value S. Curve 41 illustrates a voltage proportional to the actual value of the pressure in container 1 which is the starting signal of the pressure voltage transducer 4 and curve 42 illustrates the opening characteristic of the inlet solenoid valve 2.

From FIG. 6 it will be apparent that a pulse width modulation is attained for control of the solenoid valve upon the approach of the actual pressure to the desired pressure as a result of the superimposed sawtoothed or triangular voltage. The keying ratio which is the ratio of the switching-on period to the length of the period varies approximately to the regulator hysteresis from 1 with large deviations up to 0.5 with 0 deviation.

In the event of a deviation with a reversed polarity, the circuit 7 closes and the keying ratio becomes 0. As result, the solenoid valves open and close proportional to the deviation with very small control deviations. The result is a slower approach of the actual value to the desired or command value as result of which the regulation hysteresis can be reduced and regulation accuracy can be increased. Here also, the frequency of the alternating voltage signal imposed on the desired signal can be greater than the maximum actuating frequency of the controlled solenoid valve.

It can be seen that with the present invention solenoid valves can be controlled with a direct voltage or a high frequency rectified alternating voltage wherein the frequency of the alternating voltage is selected such that the valve is not operated because of its inertia. The frequency of the valve actuating signals are preferably much greater than the maximum switching frequency of the valve. A valve control frequency of 1 KHz may be utilized in the valves according to the present invention.

The high-frequency valve control may occur by imposing a sawtooth high-frequency signal on the desired pressure signal or by converting a signal proportional to the difference into a high-frequency valve actuating signal whose frequency and/or keying ratio is such that the arithmetic mean value of the valve actuating signal is proportional to the difference or the regulator output signal. Only the keying signal can thus be changed at a constant frequency and the frequency can be changed together with the keying ratio.

Since the "constant range" of the solenoid valve is relatively small and its position can greatly vary because of manufacturing tolerances, it is preferred that a regulator with a strong integrating characteristic be employed such as for example, a PI-regulator wherein the regulator output signal automatically "finds" the "constant range" of the valve by equalizing the 0 shift point of this area.

Another advantage of the present invention is that no "residual deviations" will occur and that switching of the solenoid valves occur only with very great differences or due to the integrating of the regulator of long lasting differences. Pressure changes due to thermal influences which may occur after rapid pressure changes in the container are equalized without actuating of the valves.

The hysteresis characteristics of the regulators are so selected that a simultaneous actuating of the inlet and outlet valves cannot occur. The simultaneous actuation of both valves would produce an unnecessary consumption of air and this consumption is thereby avoided.

The valve will be operated to provide a continuously variable valve passage for as long a period of time as it is desired to regulate the pressure in the container. This period of time may range from a few minutes up to several hours.

It will be understood that this invention is susceptible to modification in order to adapt it to different usages and conditions, and accordingly, it is desired to compre-

What is claimed is:

1. In a device for regulating the pressure of a fluid pressure medium, an electrically operated solenoid valve connected to a container and having a valve member in a passage therein movable between positions to open and close the valve passage, pressure-responsive means for generating a signal indicative of the actual pressure in a container, a comparator connected to said actual pressure signal generating means and generating a difference signal indicative of the difference between the actual pressure and a command pressure in the container, a regulator connected to said comparator to receive said difference signal and generating a regulator signal at an output thereof, means connected to said regulator output to receive said regulator signal for generating a control signal to adjust said valve member within a range intermediate the valve closed and open positions to provide a continuously variable passage through said valve during a predetermined period of time, said control signal comprises an impulse formed voltage having a frequency greater than the maximum actuating frequency of said solenoid valve.

2. In a device as claimed in claim 1 wherein said voltage signal is a rectangular voltage having a frequency which is variable continously in a predetermined range.

3. In a device as claimed in claim 1 and further comprising means for supplying a command pressure signal to said comparator, said command pressure signal is saw tooth-shaped and being variable within a predetermined range, the frequency of the command pressure signal is greater than the maximum actuating frequency of the solenoid valve.

4. In a device as claimed in claim 3 wherein said regulator comprises an integral function.

5. In a device as claimed in claim 4 wherein said regulator comprises a proportional integral regulator.

6. In a device as claimed in claim 1 wherein said solenoid is connected to the inlet of the container, and a second solenoid valve connected to the outlet of the container, said regulator generating separate regulating signals for said inlet and outlet solenoid valves.

7. In a device as claimed in claim 6 wherein the switching hysteresis characteristic of said regulator is such that simultaneous actuation of said inlet and outlet solenoid valves is precluded.

8. In a device as claimed in claim 6 and further comprising a pair of chopper amplifiers connected between said regulator and each of said inlet and outlet solenoid valves respectively, the arithmetic mean value of the output signal of said chopper amplifiers is proportional to the output signal of said regulator.

9. In a device as claimed in claim 8 wherein each chopper amplifier comprises a first and a second operational amplifier having a feed-back resistance, a first compensator resistance connected between the output of said first amplifier and the input of said second amplifier and a second compensator resistance connected between the output of said regulator and the input of said first amplifier, a third resistance connected in series with a diode and said third resistance and said diode being connected between the input of said first amplifier and the output of said second amplifier, the direction of connection of said diode being dependend upon the function of one of the inlet and outlet valves.

10. In a device as claimed in claim 3 wherein said pressure responsive means comprises a pressure electric transducer, said pressure electric transducer generating positive and negative actual pressure signals, said command presure signal supplying means generating similar positive and negative signals.

* * * * *